United States Patent [19]

Fell

[11] 3,848,647

[45] Nov. 19, 1974

[54] APPARATUS FOR MACHINING LOGS

[76] Inventor: Charles Raymond Fell, P.O. Box 218, Hudson Hope, B. C., Canada

[22] Filed: Dec. 11, 1972

[21] Appl. No.: 313,942

[52] U.S. Cl. ............... 144/3 R, 144/1 R, 144/133, 144/136 H, 144/208 G, 144/326 R, 214/1 BB, 214/1 Q, 214/7 Q
[51] Int. Cl. ............................................. B27c 9/04
[58] Field of Search .................. 214/1 P, 1 Q, 1 BB; 144/3 R, 3 P, 136 R, 136 H, 1 R, 133, 208 R, 208 G, 326 R, 3 H

[56] References Cited
UNITED STATES PATENTS

| | | | |
|---|---|---|---|
| 2,254,293 | 9/1941 | Kaehlert | 144/136 H UX |
| 2,352,885 | 7/1944 | Bukowsky | 144/208 G X |
| 2,702,570 | 2/1955 | Rothrock | 144/208 G X |
| 2,791,249 | 5/1957 | Smith | 144/3 R |

Primary Examiner—Francis S. Husar
Assistant Examiner—W. D. Bray
Attorney, Agent, or Firm—Carver and Company

[57] ABSTRACT

Log machining apparatus having lathe portion and grooving portion. Log in lathe portion is supported at headstock and tailstock, carriage with chippers is fed along bed producing cylindrically turned log. Turned log is transferred to parallel slide trough having feed carriage and cutter means having saw and grooving cutter aligned with slide trough. Feed carriage feeds turned logs through cutter producing a slotted and grooved log. Feed mechanism permits simultaneous turning of one log and slotting and grooving of a previously turned log. With minor adjustment machine can handle logs of different diameters. Fast return mechanism provided for both carriages on non-cutting return stroke and handling frames provided to lift log from lathe portion onto grooving portion.

24 Claims, 23 Drawing Figures

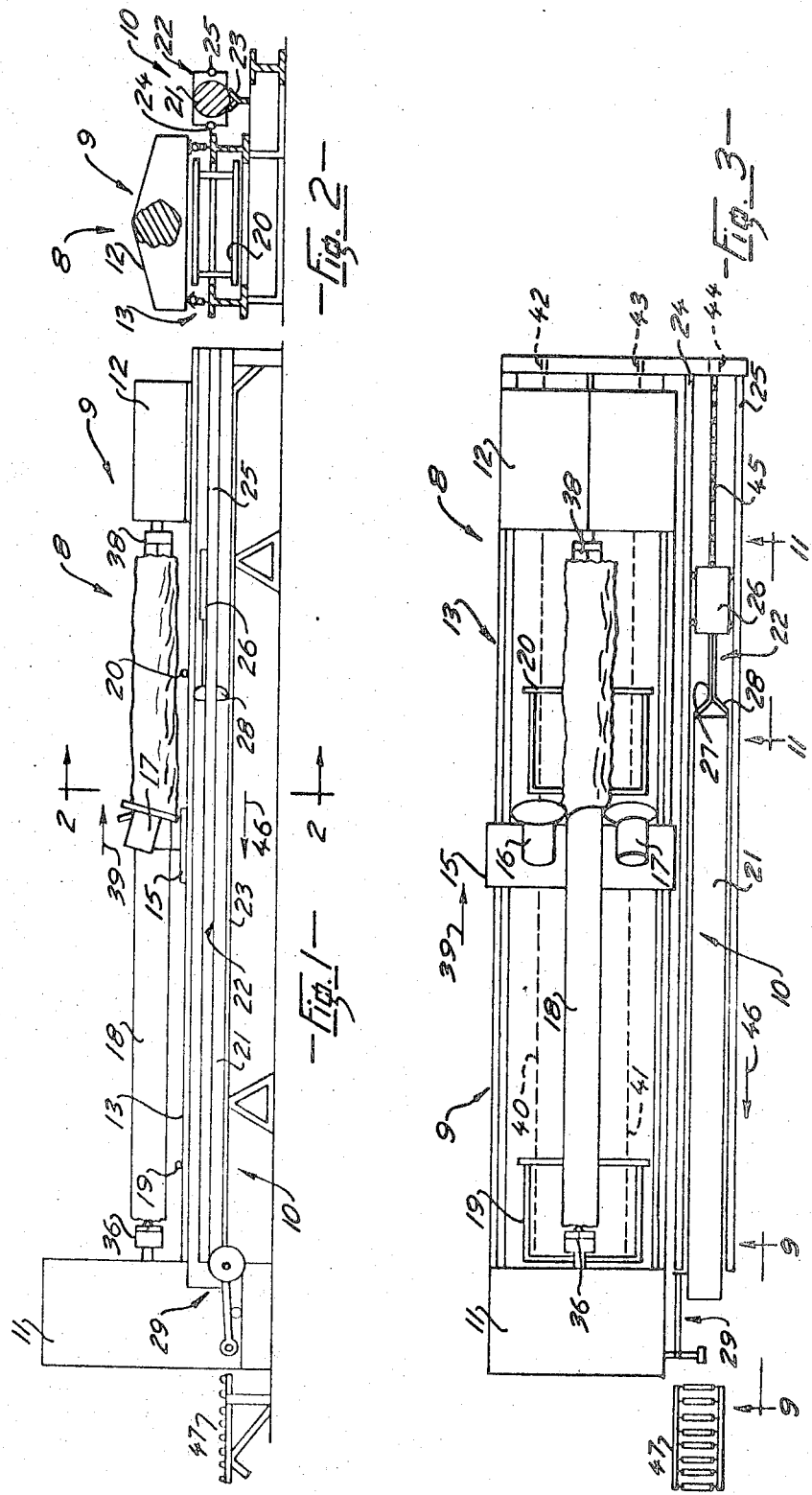

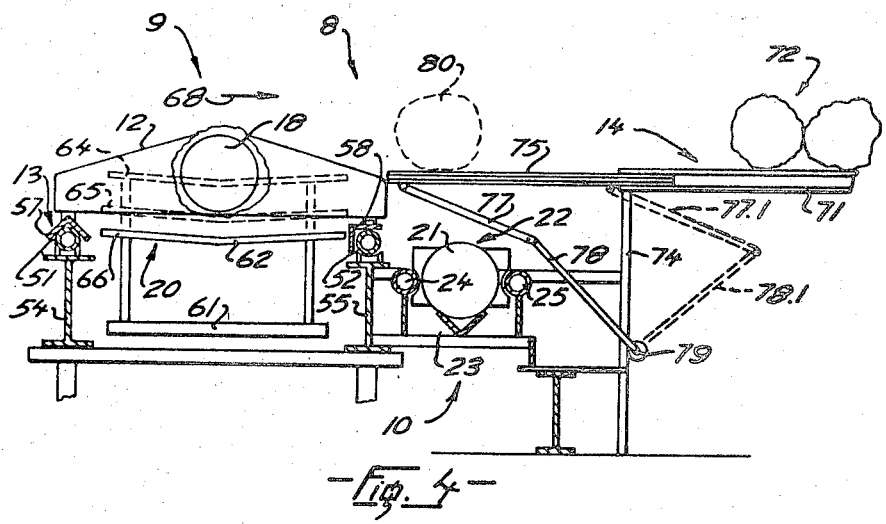

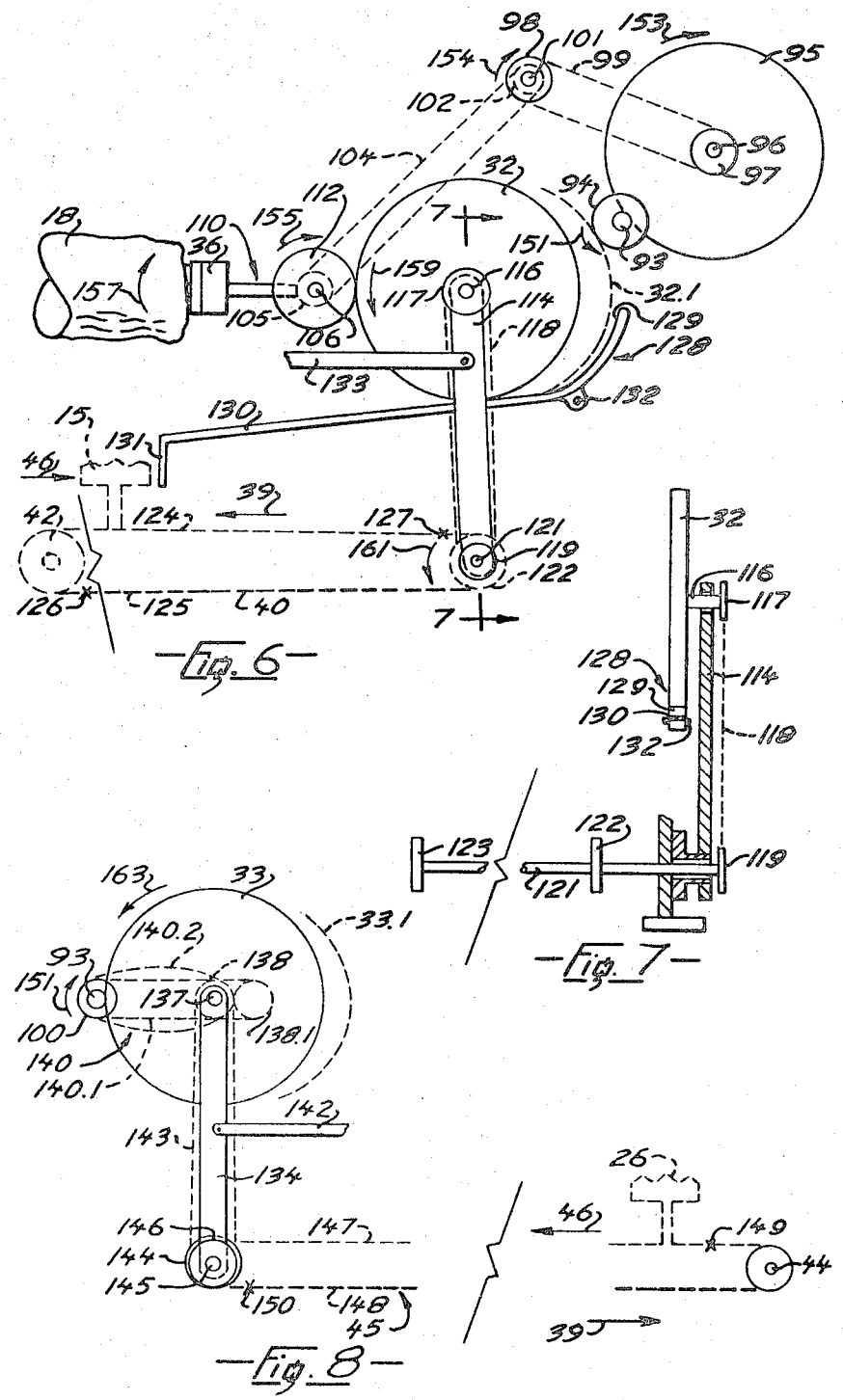

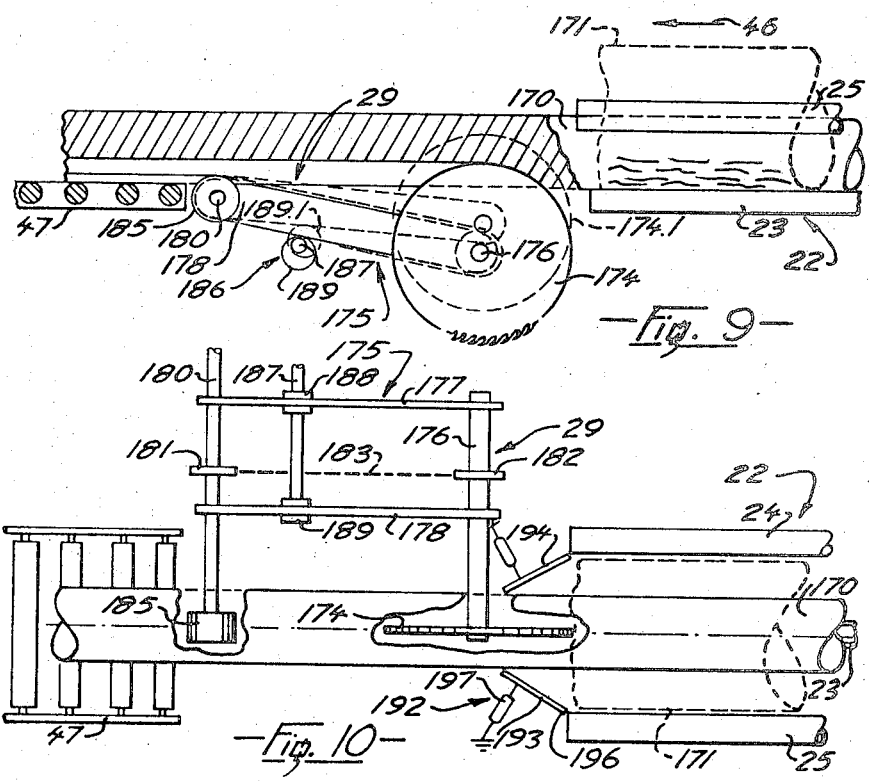
Fig. 9
Fig. 10
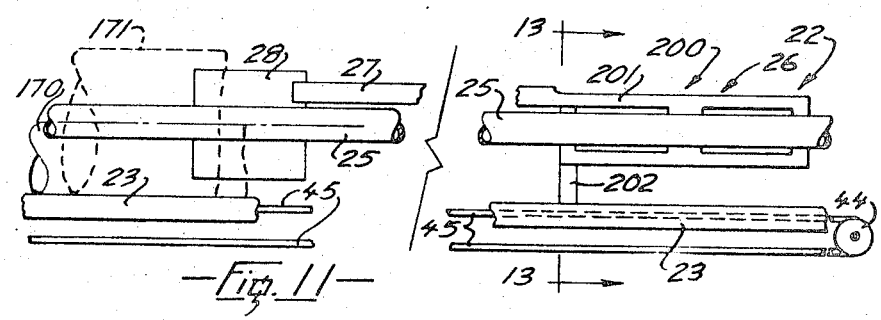
Fig. 11
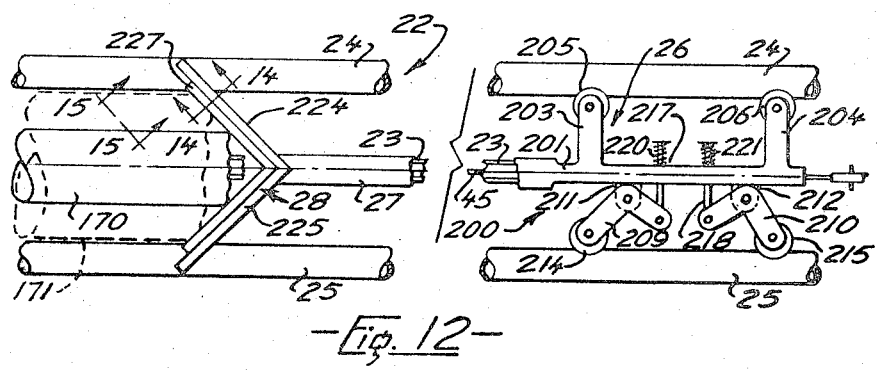
Fig. 12

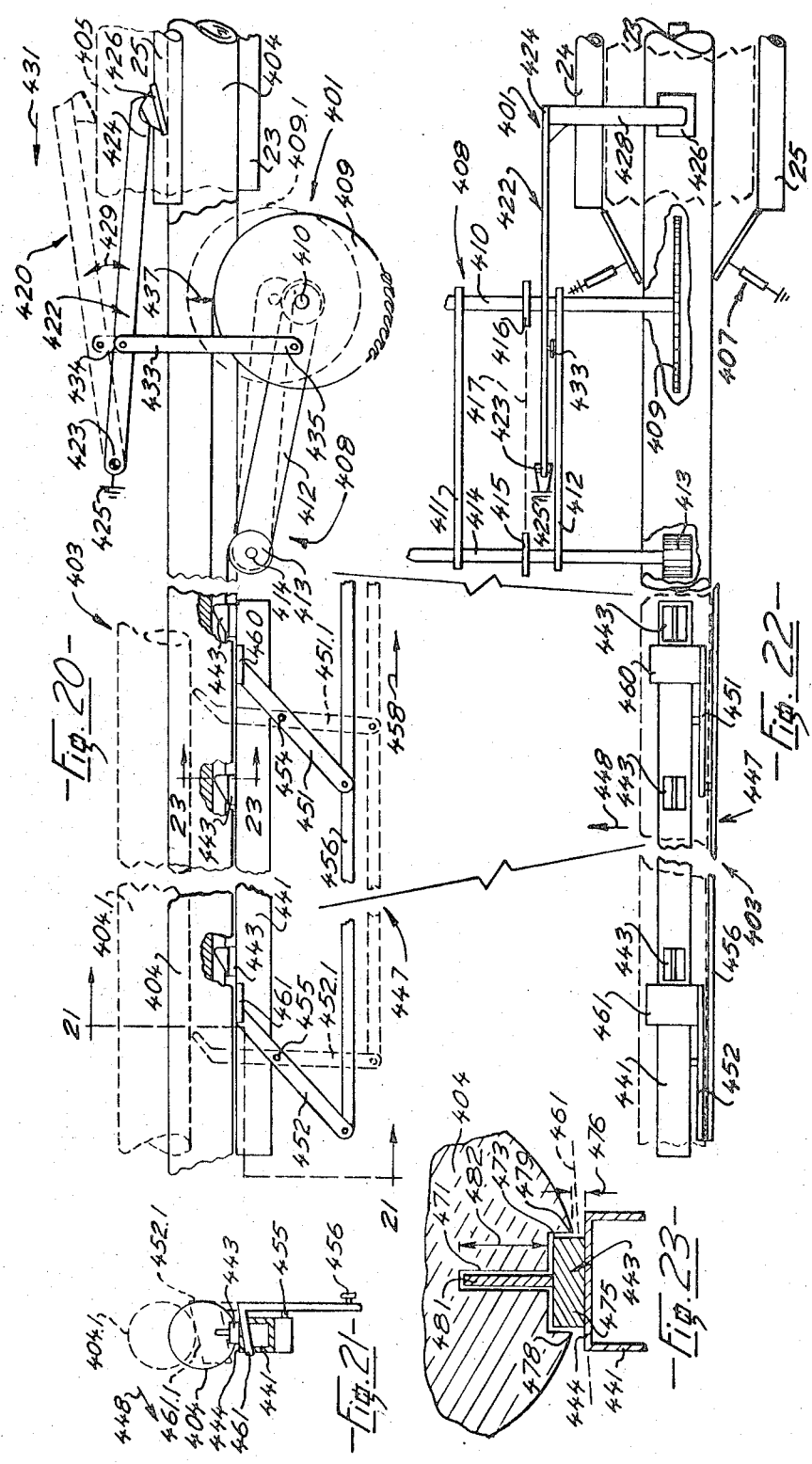

APPARATUS FOR MACHINING LOGS

BACKGROUND OF THE INVENTION

1. Field of the Invention

The invention relates to aparatus for processing logs for use in log buildings.

2. Prior art

In pioneer days log cabins were made of logs cut to length, the logs having a saddle cut near each end so that, when assembled, longitudinal peripheral contact between adjacent logs is approached. In practice, notwithstanding the logs are carefully selected for minimum taper ordinarily there is taper and some irregularity so that gaps and chinks appear between adjacent logs. Bark was often not removed, at least from that side of the logs exposed to weather, the gaps and chinks between adjacent logs were filled for instance with mud. Such a log cabin can be built with an axe alone.

Nowadays log buildings are generally constructed of logs turned to cylindrical form so as to have zero taper, and cut to suitable length. Machinery is available for turning, for effecting the saddle cuts, and for cutting to length. Ingenious structures to locate and seal adjacent logs are available, for example sometimes axial grooves are provided to accept location members, but this requires accurate machining of the groove. In some known constructions the logs are grooved to provide a space for insulating material. In constructions of this nature relatively close tolerances are required to obtain a satisfactory fit to adjacent logs, and swelling and checking often cause difficulties. Radial splitting of logs can be a problem, and it is known to provide narrow radial slots extending along the log.

SUMMARY OF THE INVENTION

The present invention relates to an apparatus for turning a log to cylindrical form and cutting a slot and a groove in the turned log.

Hereinafter, unless used in context indicating contrary meaning, "log" means a log as delivered to a mill; "turned log" means a log which has been turned to cylindrical form, "slotted and grooved log" refers to a turned log with a slot and groove.

The invention provides apparatus to produce a slotted and grooved log as above, the apparatus being capable of being controlled by one operator. The apparatus turns the log to required diameter in a lathe portion of the apparatus, the turned log then being moved to a parallel grooving portion where the log is slotted and grooved. While the slotting and grooving is being effected, a second log is placed in the lathe portion so that, when one log is being turned, the previously turned log is being slotted and grooved. Thus the apparatus is capable of simultaneously dealing with two logs.

The lathe portion includes a headstock and a tailstock, a bed extending therebetween, the headstock and the tailstock each having a dog to engage the log for rotating the log. A chipper carriage is mounted on and can be traversed along the bed and has a cutter for turning the logs as the carriage is traversed. The grooving portion has a slide through and a feed carriage mounted on the slide trough for traversing along the trough. The feed carriage has a seat to engage an end of the turned log for pushing the log as the feed carriage is traversed along the slide trough. A cutting means aligned with the slide trough has a saw and cutter for producing a radial slot and a groove respectively in the log. Feed mechanism for both the chipper carriage and feed carriage provides positive feed on the cutting stroke, for instance when turning or slotting or grooving, and has a fast return non-cutting stroke.

A detailed description following, illustrated by drawings, describes ebodiments of the invention which however can be expressed in apparatus other than that particularly described and illustrated.

DESCRIPTION OF THE DRAWINGS

FIG. 1 is a simplified diagrammatic side elevation of an apparatus according to the invention, FIG. 2 is a simplified section on 2—2 of FIG. 1, FIG. 3 is a simplified top plan of the apparatus of FIG. 1, FIG. 4 is a simplified section on 2—2 of FIG. 1 at enlarged scale, showing in addition log storage and supply means, FIG. 5 is a simplified diagram of feed selection means within a headstock of a lathe portion of the apparatus, FIG. 6 is a simplified fragmented diagram of the feed selection means for a chipper carriage as seen from 6—6 of FIG. 5, FIG. 7 is a simplified section on 7—7 of FIG. 6, some portions not being shown in section, FIG. 8 is a simplified fragmented diagram of the feed selection means for a feed carriage as seen from 8—8 of FIG. 5, FIG. 9 is a simplified fragmented side elevation of a cutting means as seen from 9—9 of FIG. 3, some portions being removed, FIG. 10 is a simplified fragmented plan view of the cutting means of FIG. 9, FIG. 11 is a simplified fragmented side elevation of a log pushing means, some portions being removed, FIG. 12 is a simplified fragmented top plan of the log pushing means of FIG. 11, FIG. 20 is a simplifid fragmented side elevation of an alternative cutting means that can be substituted for the means of FIG. 9, some portions being removed, FIG. 21 is a simplified section on 21—21 of FIG. 20, FIG. 22 is a simplified fragmented plan view of the cutting means of FIG. 20, FIG. 23 is a fragmented detail section on 23—23 of FIG. 20, showing a slotted and grooved log in engagement with a conveyor guide.

DETAILED DISCLOSURE

General description

Figures 13, 14, 15:
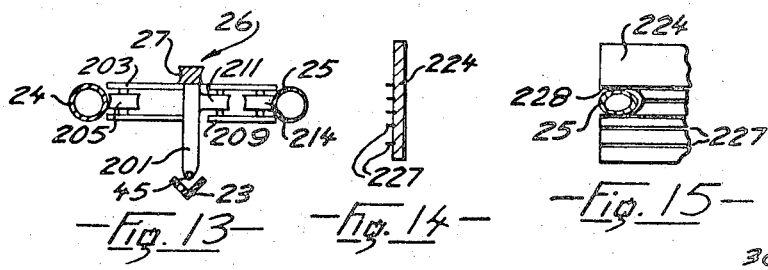
FIG. 13 is a simplified fragmented section on 13—13 of FIG. 11, some portions being omitted.
FIG. 14 is a simplified fragmented section on 14—14 of FIG. 12, some portions being omitted.
FIG. 15 is a simplified fragmented section on 15—15 of FIG. 12, some portions being removed.

Referring to FIGS. 1, 2, and 3, an apparatus 8 according to the invention has a lathe portion 9 and a grooving portion 10. The lathe portion 9 simultaneously takes a roughing cut and a finishing cut to produce a cylindrical turned log in one pass. The turned log is then placed on the adjacent grooving portion 10 and a second log placed in the lathe portion. The turned log in the grooving portion 10 is slotted and grooved, while the second log is turned in the lathe portion.

The lathe portion 9 has a fixed headstock 11, a tailstock 12 and a bed 13 extending between the headstock and tailstock, the tailstock being movable along the bed to accommodate logs of different lengths. A log storage and supply means 14 (FIG. 4) feeds logs laterally on to the lathe. A chipper carriage 15 has two chipper heads 16 and 17 which cut simultaneously, the head 16 taking a roughing cut and the head 17 taking a finishing cut, shown in FIG. 1, on a partially turned log 18. The carriage is mounted on and is traversed along the bed so that the log is turned to size in one pass, producing the turned log.

Hinged handling frames 19 and 20 are spaced at each end of the bed to lift logs on to the lathe portion from the supply means 14, and to lift a turned log 21 from the lathe portion dropping it in to an adjacent and parallel slide trough 22 of the grooving portion 10. The trough has a lower rail 23 to carry the turned log, and spaced parallel first and second upper rails 24 and 25 to reduce lateral movement of the turned log. A feed carriage 26 is mounted on and can be traversed along the trough, the feed carriage having a ram 27 with a V-shaped seat 28 engaging one end of the turned log and pushing it along the trough.

The turned log 21 in the trough is fed through a cutting means 29 aligned with the slide trough. The means 29 cuts a radial slot and axial groove producing a slotted and grooved log, the slot extending radially inwards from the groove, both the slot and the groove extending the length of the log. For use in a building, the slotted and grooved log is finished by cutting to length and by cutting saddle cuts for adjacent logs at corners of the building; this cutting being performed in a separate machine such as a machine dbscribed in U.S. Pat. No. 3,802,474 issued Apr. 9, 1974 by the same inventor entitled "Apparatus for Grooving Logs."

Flexible tension links, e.g. an endless cable and chain drive, provide controlled feed and quick return mechanism, FIGS. 6, 7, and 8, for both the chipper carriage and for the feed carriage, selection of feed and return being controlled by first and second friction wheels 32 (FIG. 6) and 33 (FIG. 8) journalled on hinged arms.

FIGS. 1, 2, and 3

Figure 16:
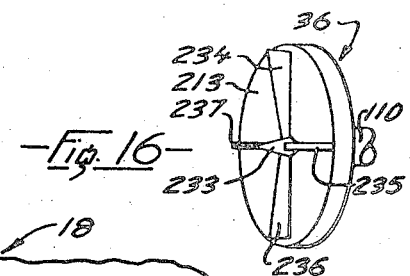
FIG. 16 is a simplified perspective of a dog.
Figure 17:
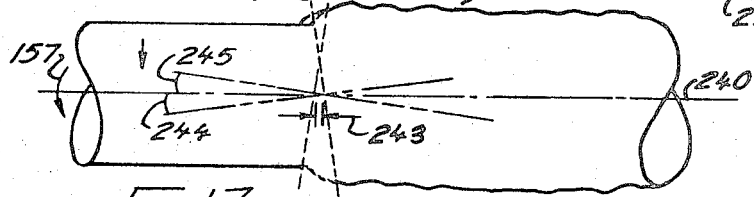
FIG. 17 is a diagram in side elevation of a log being turned.

The log 18 is supported at one end on a powered dog 36 journalled in the headstock, and at an opposite end in a free-wheeling dog 38 journalled in the tailstock, the dogs being described with reference to FIG. 16. The tailstock is moved along the bed to accommodate different log lengths, an extensible and retractable fluid cylinder (not shown) or other remotely operated means being used for this purpose. The powered dog 36 is rotated at a speed dependent on the diameter of the log, speed being selected by a mechanism described with reference to FIG. 5. The carriage 15 is traversed along the bed 13, in a direction shown by an arrow 39, by a chipper carriage feed mechanism having chain and cable drives 40 and 41 shown in broken outline. The chain and cable drives, described with reference to FIGS. 6 and 8, extend between sprockets (not shown) at the headstock and pulleys 42 and 43 at an end of the bed adjacent the tailstock and are coupled to the chipper carriage.

The turned log 21 in the trough 22 is pushed by the feed carriage 26, in a direction shown by an arrow 46, through the cutting means 29 which slot and groove the turned log, producing the slotted and grooved log. The carriage 26 is traversed along the trough by a feed carriage feed mechanism coupled to the carriage and having a chain and cable drive 45, passing around a pulley 44 at the tailstock and a sprocket (FIG. 8) at the headstock. After passing through the cutting means 29, the slotted and grooved log is carried on an outfeed roller conveyor 47 to a dip tank (not shown) containing preservative and is then removed to storage. The outfeed conveyor is aligned with and adjacent an end of the slide trough on a side of the cutting means remote from the slide trough.

FIG. 4

The bed 13 of the lathe has two spaced parallel cylindrical rails 51 and 52 secured to longitudinal supports 54 and 55 of the bed 13. The tailstock 12 is slidable along the bed, angles 57 and 58, secured to the tailstock as shown, engaging the rails. The angle 57 engages the rail as a V-block, and the angle 58 permits lateral sliding to accommodate spacing variations of the rails 51 and 52. The carriage 15 (not shown in FIG. 4) has a platform extending between the rails having similarly disposed angles which provide simple and accurate feeding along the bed. The angles 57 and 58 serve as means cooperating with the rails to restrain motion to essentially axial motion along the bed.

The handling frame 20 is journalled on a lower horizontal member 61 and has an upper cradle member 62 generally parallel to the member 61. The cradle member 62 has a shallow V-shape so as to center logs automatically on the frame relative to the dogs, facilitating loading of logs on to the dogs. Rotation of the frame 20 about member 61 is controlled by the operator by means not shown, and the cradle member can be positioned in one of three positions. The positions are designated 64 a raised position, 65 a mid-position and 66 a lowered position, the positions 64 and 65 being shown in broken outline. The handling frames 19 and 20 are synchronised to be in similar positions.

When a log is fed from the log storage and supply means 14, the cradle is in the raised position 64 being a little lower than the means 14 permitting the operator to roll a log easily. The cradle is lowered to the mid-position 65 for centering the log relative to the dog and for engagement of the dog when setting the log in the lathe portion. The tailstock is then moved along the bed so that the dogs sink into the log, supporting it for turning. Before the log is turned, the cradle 62 is put in the lowered position 66 to provide clearance for the chipper carriage 15 (not shown in FIG. 4). After the log has been turned, the cradle is again put in the mid-position to support the log when the dog 38 of the tailstock is disengaged from the log, permitting the log to be rolled, in a direction shown by an arrow 68, upward up the V until it rolls downward into the slide trough 22.

The log storage means of the means 14 has a generally horizontal tubular member 71 holding a plurality of logs 72 waiting to be turned, the member 71 being supported on vertical stanchions 74. The supply means has an inner tube 75 slidable within the member 71 and has an outer end hinged to a first link 77. A second link 78 is hinged at one end to the link 77 and at an opposite end is secured to a shaft 79, which shaft is journalled for rotation and controlled by a lever (not shown) for use by the operator. Rotation of the shaft 79 swings the pinned links from an extended position as shown, to retracted positions shown in broken outline at 77.1 and 78.1. In the retracted position, the tube 75 is telescoped into the chamber 71, providing access to the slide trough.

To load logs onto the frame 20 in the raised position 64, the shaft 79 is rotated extending the tube 75 to the extended position, and a log 80 (broken outline) is rolled by the operator onto the cradle as previously described. Thus the handling frame 20 serves as a handling means to hold the log, the means being adaptable to accept a log from the supply, to position the log so as to be acceptable to the lathe portion prior to machining, to permit the turned log to be moved easily into the slide trough, and to be moved clear of the log to permit machining of the log.

The headstock 11 houses a gear box and feed control system 91 (FIG. 5) for turning the log in the lathe, and for slotting and grooving the turned log in the slide trough. The chipper head carriage 15 is coupled to and powered by a chipper carriage feed mechanism and has a cutting stroke from the headstock to the tailstock. The feed carriage is coupled to and powered by a feed carriage feed mechanism and has a cutting stroke from the tailstock towards the headstock, both feed mechanisms being within the system 91.

Chipper Carriage Feed Mechanism, FIGS. 5, 6 and 7

With reference to FIGS. 5 and 6, a powered line shaft 93 rotates continuously during operation of the lathe and drives a primary friction wheel 95 which wheel is in continuous frictional engagement with the line shaft. The wheel 95 is secured to a shaft 96 carrying one pulley 97 of a variable speed pulley combination, the combination having pulleys 97 and 98, interconnected by a V-belt 99. The variable speed pulley combination has a continuously variable gear ratio between limits of approximately 1:1 to about 3:1, and is adjusted by means (not shown) to provide appropriate log rpm.

The line shaft 93 has a first friction drum 94 at one end, the drum being coplanar with the first friction wheel 32. A line shaft pulley 100 is provided at an opposite end of the shaft 93, and additional means (not shown) are provided on the shaft to power the cutting means 29 (FIG. 1). The variable speed pulley 98 is secured to a shaft 101 carrying a further pulley 102 which, through a belt 104 running on a pulley 105, powers a shaft 106. A right-angled drive 108 transmits power from the shaft 106 to a shaft 110 carrying the powered dog 36 of the headstock.

The shaft 106 has a second friction drum 112 at an end remote from the right-angled drive 108, which drum is also coplanar with the friction wheel 32. The wheel 32 is mounted on an outer end of a first hinged arm 114, which arm is hinged for rotation about an inner end and can be swung about a first feed shaft 121 to bring the wheel 32 into a first position in which the wheel 32 is in engagement with the drum 94, or into a second position with the wheel 32 in engagement with the drum 112. When the wheel 32 is in engagement with the drum 112, as shown, the carriage traverses away from the headstock for turning the log, as will be explained. When the arm 114 is swung so that the wheel 32 assumes a position 32.1, the first position, shown in broken outline, contacting the drum 94 which, as will be explained, reverses the carriage returning it to the headstock. Drive ratios are selected so that the carriage return stroke is at faster speed than traversing the carriage turning. As the drum 112 is also powered through the vaiable speed pulley combination, a change in log diameter changes speed of traverse during turning.

With reference to FIG. 7, the wheel 32 is secured to a short shaft 116 journalled at the outer end of the arm 114, the shaft having a pulley 117 at an outer end as shown. A belt 118 couples the shaft 116 to a first feed shaft 121 through a further pulley 119 at the inner end of the arm 114. The shaft 121 carries sprockets 122 and 123, which sprockets drive the chain and cable drives 40 and 41 (FIGS. 5 and 6) for traversing the carriage 15 along the bed.

Referring to FIG. 6, the chain and cable drive 40 is an endless loop of two joined lengths of flexible tension links of different types namely a length of cable and a length of chain. The drive 40 has an upper run 124 and a lower run 125. In the position shown, that is before a turning traverse when the carriage 15 is at the headstock, the upper run 124 is substantially a length of cable and the lower run 125 is substantially a length of chain. The length of chain of the lower run 124 adjacent the sprocket 122, around the sprocket 122 to a join 126 on the lower run 125 adjacent the pulley 42, remainder of the drive 40 being a length of cable. Substitution of cable for chain where chain is not required saves cost and reduces chance of chain derailment on the fast return stroke. Positive feed of chain and sprocket is used for the turning traverse so as to gear log rotation to carriage feed. Tensioning means (not shown) are used to take up slack in the drive.

With reference to FIG. 6, a carriage return brake generally 128 is provided to disengage and brake the wheel 32 when the carriage 15 approaches the headstock. When the carriage approaches the headstock, the wheel 32, in the broken outline position 32.1, is rotating in a direction opposite to an arrow 159. A brake rod 130 has a braking portion 129 at one end and a contact pad 131 at opposite end, the pad 131 being positioned and aligned with a portion of the carriage 15 (shown in broken outline) so that, when the carriage 15 returns to the headstock it contacts the pad 131. The brake rod is hinged at 132 to permit limited rotation when contacted by the carriage 15, which rotation forces the braking portion 129 against the wheel 32 and simultaneously disengages the wheel 32 from the drum 94. A return spring (not shown) maintains the brake non-active until contacted by the carriage 15.

The hinged arm 114 is moved by a rod 133 actuated by a lever (not shown) which lever is controlled by the operator. Over-centering means are provided to lock the arm 114 in, either a feed position for turning i.e. the second position, or a fast-return position i.e. the first position.

Feed Carriage Feed Mechanism FIGS. 5 and 8

The first line shaft 93 also provides power for feeding the feed carriage 26 (FIG. 1) along the slide trough 22. Referring to FIG. 8, a second hinged arm 134, similar to the arm 114, journals the second friction wheel 33 at an outer end, and is hinged at an inner end for rotation through a limited arc to be described. The wheel 33 is secured to a clutch shaft 137 carrying a clutch pulley 138 aligned with the pulley 100 of the line shaft 93. A V-belt 140 extends around the pulleys 138 and 100, and transmits power from the pulley 100 on the line shaft to the pulley 138, when the arm 134 is in a first position with the belt 140 taut. When the belt 140 is taut, it assumes a position at 140.1, the belt thus transmitting power, and the wheel 33 assumes a broken outline position 33.1 and is clear of the line shaft 93. When the arm 134 is swung to a second position as shown, the wheel 33 is forced against the line shaft 93, the belt 140 assumes a slack position 140.2 and slips on the pulleys 100 and 138. The belt 140 in combination with the line shaft thus limits swinging of the arm 134, the combination providing a feed carriage direction control which incorporates a clutch which is engaged when the belt 140 is taut and disengaged when the belt is slack. The line shaft 93 thus serves as a friction drum or cylinder.

As seen in FIG. 8, the hinged arm 134 has a rod 142 provided with known over-centering means (not shown) such that the arm is held at will either in the feed position, i.e., the second position, or in the fast-return position, i.e., the first position. The rod 142 is connected to a lever (not shown) controlled by the operator, and drive ratios are selected to attain a fast-return stroke.

For feeding the carriage 26 on a cutting stroke, the wheel 33 is moved to the second position and forced against the line shaft 93 and power is transmitted to the shaft 137. The V-belt 140 is in the slack position 140.2 and slipping occurs, the belt serving as a slipping clutch. A V-belt 143 couples the pulley 138 to a pulley 144 at a lower end of the arm 134, the pulley 144 being mounted on a second feed shaft 145. A sprocket 146 secured to the shaft 145 powers the chain and cable drive 45 for the feed carriage 26 (broken outline).

The chain and cable drive 45 is similar to the drive 40 (FIG. 6) and has an upper run 147 being a length of chain and lower run 148 being a length of cable. The chain extends from a join 149 adjacent the pulley 144 around the sprocket 146 to a join 150 adjacent the sprocket 146. Similarly to the drive 40, feed of the turned log through the cutting means 29 (FIG. 1) is positive feed of chain and sprocket. For quick return of the carriage 26 towards the tailstock, the arm 134 is swung into the first position so that the wheel 33 assumes the position 33.1 (broken outline), in which position the V-belt is taut and the wheel 33 clears the line shaft 93, and drive is through the cable.

Operation of Feed Mechanism

1. Turning the Log

With reference to FIG. 6, to turn the log the arm 114 is moved to the second position so that the wheel 32 is in frictional engagement with the friction drum 112, and the chipper head carriage 15 traverses in the direction of the arrow 39. The line shaft 93 rotates continuously in the direction shown by an arrow 151, thus rotating the primary friction wheel in a direction shown by an arrow 153. The belt 99 rotates the pulley 98 of the variable speed drive in a direction shown by an arrow 154, which pulley, through the belt 104, drives the pulley 105, and with it the shaft 106, in a direction of an arrow 155. The right-angle drive 108 transmits power to the shaft 110, then to the dog 36, rotating the log in a direction shown by an arrow 157. Rotation of the drum 112 rotates the primary friction wheel 32 in a direction shown by an arrow 159 which, through the pulley 117, the belt 118, and the pulley 119, rotates the shaft 121 in a direction shown by an arrow 161. The upper run 124 of the drive 40 traverses the carriage 15 in the direction of the arrow 39 along the bed of the lathe, the sprockets 122 and 123 driving the lengths of chain.

Speed of rotation of the log 18 is selected, and set by the variable speed pulleys 97 and 98, and irrespective of log rpm, for one rotation of the log, the carriage traverses at a maximum the width of the chipper heads, so as to reduce chances of cutting a helix along the log. Gearing between the rotation of the log and the feed of the carriage is independent of the diameter of the log; and one drive adjustment only, that is adjustment at the variable speed drive, is required for a change in log diameter. Change in depth of cut and in radial settings of chipper heads is required for change in log diameter, means for effecting such changes are not shown. Infeed mechanism of the finishing cut chipper head 17 is selected to provide increments of ½ inch to produce logs having finished diameters in increments of 1 inch.

To return the chipper head carriage 15 to the headstock, the hinged arm 114 is swung to the first position so that the wheel 32 assumes the position 32.1, the wheel 32 now touching the drum 94 and being clear of the drum 112. The drum 94 rotates as shown reversing the direction of rotation of the wheel 32, thus causing the upper portion of the cable 40 to travel in the direction shown by the arrow 46, returning the carriage 15 towards the headstock. As the carriage approaches the headstock, it contacts the pad 131 of the brake rod 130, rotating the brake rod about the hinge 132 until the braking portion 192 contacts the wheel, disengaging the wheel 32 from the drum 94, and simultaneously braking the wheel and thus stopping return of the carriage. Fast return of the carriage is at a higher speed than feed for turning to save time on returning of the carriage, and is obtained by selection of relative diameters of the pulleys and friction wheels.

2. Slotting and Grooving the Log

With reference to FIG. 8, to slot and groove the turned log, it is fed through the cutting means 29 (FIG. 1) by traversing the carriage 26 in the direction shown by the arrow 46, by swinging the second arm to the second position in which the wheel 33 contacts the line shaft 93. The line shaft rotates continuously as shown, and when the wheel 33 contacts the line shaft, the wheel 33 rotates in a direction as shown by an arrow 163, and with it the shaft 137. In this position the belt 140 is in the slack position 140.2, serving as a slipping clutch. Thus, through the pulley 138, the belt 143 and the pulley 144, the shaft 145 is rotated, rotating the sprocket 146. The upper run 147 of the chain and cable drive 45 travels in the direction shown by an arrow 46, pulling the feed carriage 26 towards the headstock, and forcing the turned log through the cutting means 29 (FIG. 1) producing a slotted and grooved log.

To return the carriage 26 to the tailstock, the arm 134 is swung to the first position so that the wheel 33 attains the broken outline position 33.1 in which the belt 140 is in the taut position 140.1, transmitting the drive from the pulley 100 to the pulley 138 in the position 138.1, reversing direction of rotation of the wheel 33. The rotation of the wheel 33 is transmitted to the sprocket 146, which rotates in an opposite direction to traverse the carriage 26 in the direction of the arrow 39.

FIGS. 9 and 10

A narrow radial slot 249 and a shallow axial groove 250 are cut along the length of the log, the slot and groove to be described with reference to FIG. 18. The lathe portion handles logs within a diameter range of, for example, a minimum turned diameter of 6 inches, and a maximum turned diameter of 12 inches. A small turned log 170 6 inches in diameter is shown in full line, and a large turned log 171 12 inches in diameter is shown in broken outline. The cutting means 29 handles turned logs within this range of diameters, minor adjustments to compensate for changes in turned log dameter being easily effected, as is later explained.

The cutting means has a saw 174 mounted on an arbor 176, the saw being capable of cutting to a depth of one-half of the diameter of the maximum turned log to be handled. A saw carrier 175 having inner and outer ends journals the arbor for rotation at the outer end, the carrier being hinged for rotation at an inner end. The carrier has two arms 177 and 178 as shown, the arms being journalled on a powered shaft 180, the shaft being driven by means (not shown) from the line shaft 93 (FIG. 5). A pulley 181, mounted on the shaft 180, drives the arbor 176 through a belt 183 and a pulley 182. When the carrier rotates about the inner end the saw swings through an arc and remains coplanar with a vertical diametrical plane of a turned log carried in the slide trough.

The shaft 180 carries a grooving cutter, for example a planar head 185, which head straddles a central plane of the saw 174 so that side walls of the groove cut by the planar head are spaced equally on either side of the diametrically disposed slot produced by the saw 174, the slot and groove being described with reference to FIGS. 18 and 19.

A depth of cut of the slot is manually selected by a depth of cut control means 186, which includes a cam shaft 187 which carries cams 188 and 189, the cams supporting the arms 177 and 178 respectively. The slot extends between one third and one half of the log diameter into the log and thus the means 186 swings the saw to a particular position to cut a slot having a depth appropriate for log diameter.

In FIG. 9 the carrier 175 is shown in a lowered position for producing a slot in the six inch diameter turned log 170. Rotation of the cams 188 and 189 to a broken outline position 189.1 raises the saw 174 to a second position 174.1 shown in broken outline, a position for slotting the 12 inch diameter turned log 171. Intermediate settings for, say, 9 inch diameter logs are selected by rotation of the cams to intermediate positions. Further rotation of the cams to a third position (not shown), in which the saw has a depth of cut of 6 inches, that is, the radius of the 12 inch diameter turned log 171, is used for cutting large logs in half in two passes, half logs so produced being used for lowest logs adjacent the foundation in some walls of log buildings.

When the saw is in the third position above, a 6 inch log can be cut in half in one pass to form a half turned log.

By selection of dimensions of the rail 23 of the slide trough 22, a change in log diameter from the 6 inch to a 12 inch log does not require movement of the planer head 185. Parameters determining selection of the rail are described with reference to FIGS. 18 and 19.

With reference to FIG. 10 the parallel upper rails 24 and 25 serve as restraining means for the large diameter turned logs 171. For smaller diameter turned logs, additional log restraining means 192 are used. The log restraining means 192 includes a pair of spaced hinged flaps 193 and 194 which straddle the log as shown. The flap 193 is hinged at an inner edge 196 to a rigid portion of the apparatus and has a resilient means 197 to force the flap inwards towards the log so that an outer edge thereof contacts the log. The flap 194 is similarly hinged so that the flaps straddle the log. The two hinged flaps together tend to centralize the smaller turned logs on the rail 23, improving accuracy of cut of the saw. Other means for restraining smaller diameter logs can be provided.

FIGS. 11 and 12

The feed carriage 26 includes a trolley 200 which extends between and cooperates with the rails 24 and 25 and is resiliently mounted to compensate for variations in spacing between the rails 24 and 25. The resilient mounting also provides an easy means of removing the carriage 26 from the rails for maintenance.

The trolley 200 has a longitudinal member 201, secured to the ram 27 and a downwards extending arm 202 connected to the upper run of the chain and cable means 45. Brackets 203 and 204 extend outwards from the member 201 and journal a first pair of spaced rollers 205 and 206 running on the rail 24, the rollers having grooved peripheries similar to pulleys. Curvature of grooves in the periphery of the roller approximates to an outer circumference of the rail so as to be complementary to the rail. Hinged bellcranks 209 and 210 are journalled in bellcrank brackets 211 and 212 extending from a side of the member 201 remote from the brackets 203 and 204. Outer ends of the bellcranks journal a second pair of spaced rollers 214 and 215 similar to the rollers 205 and 206. Inner ends of the bellcranks are resiliently connected to a rigid portion of the carriage. Push rods 217 and 218 extend through the central member 201 and are urged axially by compression springs 220 and 221 which force rollers 214 and 215 outwards. Thus, variations in spacing between the rails 24 and 25 are accomodated by movement of the second pair of rollers due to small rotations of the bellcranks due to the springs 220 and 221, and the grooved peripheries of the rollers restrict vertical movement of the trolley relative to the rails.

With reference to FIG. 12, the V-shaped seat 28 has two walls 224 and 225 disposed symmetrically relative to the slide trough and at about 90° to each other and engage an end of a turned log within the 6 to 12 inch diameter range without adjustment for size change, the end of the log being generally obliquely cut.

With reference to FIG. 14 the wall 224 has a plurality of spaced parallel knife edges 227 extending so as to engage portions of the end of the turned log, the knives being log engaging means which restrain the turned log against rotation.

With reference to FIG. 15 the wall 224 is relieved at 228 to provide clearance for and to cooperate with the rail 25, which rail prevents excessive lateral movement of the seat 28. The wall 225 is similar to the wall 224 and is not described. The relief above serves as a seat guide means to restrict movement of the seat to essentially axial movement along the trough.

FIG. 16

The dogs 36 and 38 at the headstock and the tailstock are substantially identical and are particularly adapted to engage logs with an obliquely cut end face. The dog 36 is only described and has a disc member 231 extending from the shaft 110 (FIG. 5) with a central cone 233 adapted to penetrate centrally the end face of the log. Four radially extending knife edges 234 through 237 extend from the cone and prevent the log rotating relative to the dog. Other means of supporting and driving logs can be used such as chucks with sliding jaws, or face plates.

Fig. 17

The partially turned log 18 of FIG. 1 is, as previously described, turned in one pass of the chipper carriage 15 to a finished diameter. The chipper head 16 takes a roughing cut, the chipper head 17 simultaneously taking a finishing cut. A portion of the log 18 being cut is shown in side elevation rotating about an axis 240 in a direction of the arrow 157 (FIG. 5). The chipper heads 16 and 17 have peripheral chipper knives disposed in diametrical planes 241 and 242 which are shown as a broken line and as a full line respectively, direction of rotation of the chipper heads being such as to produce an effective removal of wood with a good finish. The chipper head plane 241 is advanced relative to the chipper head plane 242 by a distance 243, which is sufficient to ensure that the chipper head 17 takes a light finishing cut by cutting after the roughing cut of the head 16, thus producing a good finish. Axes of the chipper heads 16 and 17 are at angles of inclination 244 and 245 to the horizontal. viz. to the axis 240, which angles are dependent on feed of the chipper carriage per revolution of the log. As the chipper heads are traversed against a rotating log a helix angle of cut is produced on the log. The angles of inclination above are compatible with the helix angle of cut to obtain a good finish. Other types of chipper units or cutters can be used.

Figs. 18 and 19

Figure 18:
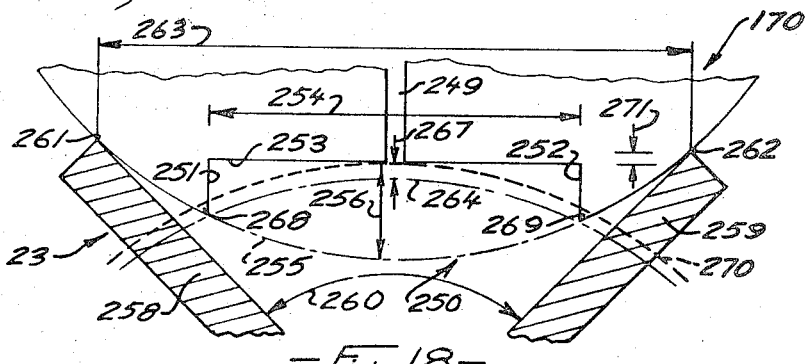
FIG. 18 is a simplified section adjacent a lower portion of a turned log of minimum diameter in engagement with a slide trough, the log not shown in section.

In FIG. 18 a lower portion of the small log 170 is shown bearing on the lower rail 23 of the slide trough 22, the log having a narrow radial slot 249 and a shallow axial groove 250. Side walls 251 and 252 and a groove face 253 of the axial groove 250 are cut by the planer head 185 (FIGS. 9 and 10) and are shown relative to the rail 23, ie. after a leading portion of a turned log has been slotted and grooved. The groove 250 has a width 254 defined by spacing of the slide walls 251 and 252 and distance between the face 253 and a lowest portion of the log before grooving (shown in broken outline at 255) defines maximum depth 256 of the groove, that is, maximum depth of cut of the planer head. The line 255 is a virtual arc of the circumference of the log produced across the groove and the depth 256 is defined as a virtual depth. The rail 23 has two inclined flanges 258 and 259 inclined at an angle 260 as shown. Upper edges 261 and 262 of the flanges 258 and 259 are spaced at a dimension 263, and engage the log 171 as shown, and support it whilst it is slid along the feed trough. Lower edges 268 and 269 of the side walls 251 and 252 of the groove are corners of the groove and are formed when the groove is cut.

When the log 170 is used in a building it rests on a lower log having an upper surface 264, shown in broken outline. As can be seen the edges 268 and 269 contact the upper surface 264 in a first position which results in a gap 267, about one-eighth to three-sixteenths of an inch, between the groove face 253 and the surface 264, assuming no compression of the edges 268 and 269. However, weight of the log itself, plus other logs in the wall above compress and deform the lower edges 268 and 269 causing the upper surface 264 of the lower log to bear against the groove face 253 as shown in broken outline in a second position 270. Thus the groove face carries much of the weight of the wall above, which weight is transferred to the upper surface of the lower log. The edges 268 and 269 are thus compressed an amount approximately equal to the gap 267. The amount of compression can be calculated approximately and then found by experiment, and is dependent mainly upon diameter of the log, height of the wall, and softness of the wood.

To control the amount of lower edge compression, the gap 267 is critical, which gap, other factors being constant is dependent upon relative vertical spacing between the groove face 253 produced by the planer head when it cuts, and horizontal spacing 263 of the upper edges 261 and 262 of the rail 23. The relaitve vertical spacing above is designated 271 and, as the planer head is fixed relative to the rail 23 for all the diameters of logs between 6 inches and 12 inches, position of the edges 261 and 262 relative to the planer head thus is important.

Figure 19:
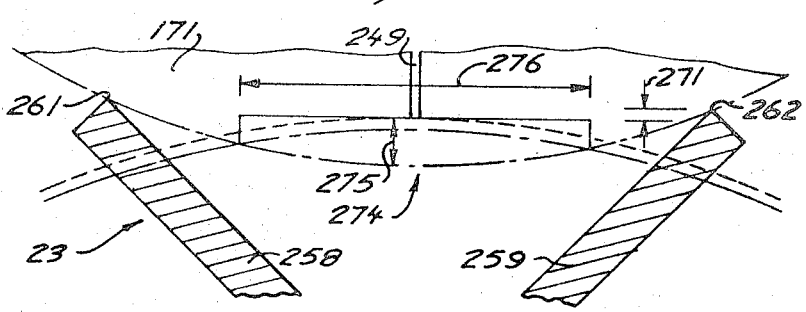
FIG. 19 is a simplified section adjacent a lower portion of a turned log of maximum diameter in engagement with the slide trough, the log not shown in section.

With reference to FIG. 19 the large diameter log 171 is shown resting on the edges 261 and 262, which log has an axial groove 274 having a maximum depth 275 which, from geometrical considerations is shallower than the depth 256 of the groove 250. Width 276 of the groove is unchanged from the width 254 (FIG. 18). The vertical spacing 271 between a top wall 277 of the groove 274 and the upper edges 261 and 262 of the rail is also unchanged and, as the log 171 does not rest so deeply in the rail 23 as the log 170, a shallower groove is produced automatically.

Thus, for a change in turned log diameter within a range of 6 inches to 12 inches, that is, a 2:1 diameter ratio, the planer head position relative to the rail 23 is fixed, and height of the saw 174 (FIG. 9) only is adjusted to compensate for changes in log diameter. The saw 174 cuts the radial slot having a width of about one-quarter of an inch and a depth of about one-third to one-half of the turned log diameter, which depth is determined by position of the cams 188 and 189 (FIG. 9). The depth of the slot is not critical, variations of about one-sixth of a diameter radially being tolerable. The slot reduces undesirable splitting as the log dries, width of the slot being generally immaterial.

The angle 260 between the flanges 258 and 259 is immaterial provided that change in diameter of log effects depth of cut so as to produce a shallower axial groove with increase in diameter of log, the planer head remaining fixed. The spacing 263 of the edges 261 and 262 is important and is found by graphical construction or by trial and error. Satisfactory results have been found with the spacing 263 of about 4 ⅛ inches in combination with a planer head having a width of about 2½ inches and a relative spacing 271 of about three sixteenths of an inch. Other types of lower rail can be substituted, provided that a change in log diameter produces a compatible change in depth of groove, and that the lower rail simultaneously supports the log and restrains it to axial motion along the slide trough.

ALTERNATIVES AND EQUIVALENTS

FIGS. 20 through 23

An alternative cutting means 401 and an alternative outfeed conveyor 403 can be substituted for the cutting means 29 and conveyor 47 of FIGS. 9 and 10.

With reference to FIGS. 20 and 22, the lower rail 23 supports the turned log which is fed into the cutting means, a small diameter turned log 404 being shown in full outline and a large diameter turned log 405 being shown in broken outline. A log restraining means 407, similar to the log restraining means 192 of FIG. 9 centralizes the smaller logs on the lower rail 23. A saw 409 mounted on an arbor 410 is journalled for rotation at an outer end of a saw carrier 408 having parallel swinging arms 411 and 412. A planer head 413 is journalled on an arbor 414 at an inner end of the saw arbor. The saw produces a narrow radial slot in the log, and the planer head produces a groove, thus producing a slotted and grooved log as previously described. The arbor 414 is powered by means (not shown), power from which is transmitted through sprockets 415 and 416 and a chain 417 to the saw 409.

An automatic depth of cut control means 420 eliminates the manually controlled depth of cut control means 186 of FIG. 9. The means 420 provides a fully automatic means of adjusting depth of cut of the slotting saw 409 to produce a slot depth appropriate for a particular log diameter for a range of turned log diameters from the smallest to the largest. For slotting the small diameter log, the saw 409 is in full outline position and for slotting the large diameter log the saw is raised to a broken outline position 409.1. The means 420 has a sensor arm 422 hinged at an inner end 423 to a portion 425 of framework, an outer end 424 of the arm having a transverse arm 428 carrying a shoe 426, the arm 428 being shown in FIG. 22 only.

The shoe 426 is adapted to contact an upper surface of the log and is at an angle so that, as a forward end of the turned log moves in a direction shown by an arrow 431, the arm 422 rotates through an arc permitting the log to slide underneath. The arm 422 swings through an arc 429 to handle all turned logs from the small diameter turned log 404 to the large diameter turned log 405.

A link 433 has an upper end 434 hinged to the arm 422 and a lower end 435 hinged to the swinging arm 412. The positions of the hinge points of the link 433 are selected so that, as the arm 422 is swung through the arc 429 accommodating the range of log diameters, the saw 409 moves from the lowered full outline position through a distance 437 to the raised broken outline position 409.1. Thus, depth of the slot produced by the saw 409 is automatically proportional to log diameter without requiring adjustment by the operator. A stop (not shown) on the arm 428 contacts the rail 24 to prevent the arm 422 swinging to an extreme low position such that the shoe 426 is inoperative for raising the arm to pass turned logs.

The alternative outfeed conveyor 403 has a horizontal base member 441, of square cross-section as shown in FIG. 29, and is generally aligned with the lower rail 23. The base member 441 is an upper surface of the conveyor 405 and receives and supports a slotted and grooved log after processing by the saw 409 and the planer head 413. To maintain axial translation of a leading portion of the log so as to process a trailing portion with negligible deviating, a plurality of guides, designated severally 443, is provided along an upper surface 444 of the member 441 and are described in detail with reference to FIG. 23. The guides are complementary to, and are a sliding fit in, the slotted and grooved log and maintain substantial axial translation of the log from the cutting means 401 to produce straight cuts, and reduce binding of the saw. The log 404 is shown passing through the saw, whilst being fed by the feed carriage 26 (FIGS. 1 and 3).

Unloading means 447 are adapted to raise the log out of engagement with the guides 443 and transfer the log sideways from the base member 441, as shown in FIG. 22 by an arrow 448. The means 447 has a pair of parallel arms 451 and 452, hinged on pins 454 and 455 and hinged at lower ends to a horizontal control rod 456, forming a three-sided parallel arm mechanism. The control rod is connected to a hinged lever (not shown) controllable by the operator so that movement of the rod 456 substantially in a direction shown by an arrow 458 rotates the arms to raised positions 451.1 and 452.1 shown in broken outline. Upper ends of the arms 451 and 452 have kick-off plates 460 and 461 adapted to carry the log 404 to a raised position 404.1 shown in FIGS. 20 and 21. When the arms are lowered the kick-off plates are in a lowered position, so that the log can slide as shown by the arrow 431.

With reference to FIG. 21, movement of the plate 461 to a raised position 461.1 moves the log to the raised position 404.1. The plate 461 has a shallow slope to promote rolling of the log in the direction of the arrow 448, that is plate is inclined at an angle to the horizontal in a vertical plane normal to feed direction of the log, the inclination causing the log to roll transversely across the plate. The slope is such that a log can be lifted freely off the guide 443, with little tendency of the log to jam on the plate due to transverse forces arising from the slope of the plates. The log rolls into a preservative tank (not shown).

FIG. 23

The log 404 has a slot 471 produced by the saw 409, and a groove 473 produced by the planer head 414, forming lower edges 478 and 479. The guide 443 has a block 475 having spaced parallel sidewalls and an upper face, dimensions of which permit a sliding fit within the groove 473, the upper surface carrying the log to provide a clearance 476 between lower edges 478 and 479 and the upper surface 444 of the base 441. A vertical fin 481 is secured to the block 475 as shown, and is a sliding fit in the slot 471. The slot 471 is a slot for the small diameter log 404 and has a depth, defined by dimension 482, being somewhat greater than height of the fin 481. The large diameter log 405 (FIG. 20) has a correspondingly deeper slot so that the fin extends upwards to a position a portion of the way up the slot. For all sizes of logs handled by the machine, the block 475 supports the weight of the log and the fin 481 guides the log generally axially so that the saw 409 produces a relatively true cut and binding of the saw is reduced.

During operation of the device, the turned log is fed through the saw until the feed carriage 26 (FIGS. 1 and 3) reaches the end of its travel. The ram 27 pushes the log clear through the saw 409 and the planer head 413, so that unloading means 447 can lift the log clear of the guides without risk of binding the saw. The slide trough 22 is then vacant and can accept another turned log from the lathe.

I claim:

1. Apparatus for machining a log having a longitudinal axis, the apparatus having a lathe portion, a grooving portion and a handling means, wherein the lathe portion includes:
   a. a headstock and a tailstock, a bed extending between the headstock and the tailstock, the headstock and tailstock each having a dog for engaging the log for rotating the log about the longitudinal axis thereof,
   b. a chipper carriage mounted on the bed so as to be traversed along the bed, the carriage having a cutter for turning the log as the carriage is traversed along the bed to produce a turned log,
   c. a chipper carriage feed mechanism coupled to the chipper carriage to traverse the chipper carriage along the bed, wherein the grooving portion includes:
   d. a slide trough for carrying a turned log, the slide trough being adjacent and parallel to the bed,
   e. a feed carriage mounted on the slide trough for traversing along the slide trough, the feed carriage having a seat to engage an end of the turned log for pushing the log,
   f. a feed carriage feed mechanism coupled to the feed carriage to traverse the feed carriage along the slide trough,
   g. cutting means aligned with the slide trough so that as the turned log is traversed along the trough by the feed carriage the cutting means cuts a groove and a slot in the turned log producing a slotted and grooved log, and wherein the handling means includes:
   h. means to hold the log, the means being adaptable to accept a log from a supply, to position the log so as to be acceptable to the lathe portion prior to machining to permit the turned log to be moved easily into the slide trough, and to be moved clear of the log to permit machining of the log.

2. Apparatus as claimed in claim 1 in which the handling means includes:
   i. a pair of spaced handling frames provided adjacent the bed, each frame having an upper cradle member to engage a log, and a lower member for journalling the frame for rotation, each frame having a raised position in which the cradle accepts the log from the supply, a mid-position in which the cradle supports the log during engagement and disengagement of the log from the dogs, and a lowered position in which the cradle is clear of the log, permitting rotation of the log and traversing of the chipper carriage.

3. Apparatus as claimed in claim 1 further including:
   i. an outfeed conveyor to accept the slotted and grooved logs from the cutting means, the conveyor being aligned with and adjacent an end of the slide trough, on a side of the cutting means remote from the slide trough.

4. Apparatus as claimed in claim 1 further including:
   j. a log storage and supply means, the storage means for holding logs prior to turning and the supply means being extensible from the storage means so as to supply logs to the lathe portion at a position acceptable to the handling means.

5. Apparatus as claimed in claim 1 in which the chipper carriage feed mechanism includes:
   i. a first hinged arm having outer and inner ends, the arm being hinged for rotation about the inner end, a first feed shaft driving drive means coupled to the chipper carriage, a first friction wheel journalled for rotation at the outer end of the arm, the friction wheel being coupled to the first feed shaft.
   ii. a first friction drum mounted on a first shaft and powered to rotate in one direction, a second friction drum mounted on a second shaft and powered to rotate in an opposite direction, the drums being coplanar with and spaced on either side of the first friction wheel, the drums being spaced apart sufficiently so that only one drum is brought into contact with the friction wheel at one time, so that swinging of the hinged arm into a first position in which the friction wheel contacts the first friction drum drives the friction wheel, and with it the chipper carriage in one direction, and swinging of the hinged arm into a second position in which the friction wheel contacts the second drum feeds the chipper carriage in an opposite direction, the chipper carriage having travel in both directions.

6. Apparatus as defined in claim 5 in which the feed mechanism further includes:
   iii. a carriage return brake having a brake rod having at one end a contact portion and at an opposite end a braking portion, the rod being hinged for limited rotation; the contact portion being adjacent the bed and positioned so as to be contacted by the carriage as the carriage approaches an end of the travel thereof, the braking portion being complementary to the friction wheel and positioned adjacent the friction wheel when the friction wheel is being driven by a friction drum which drives the carriage towards the braking portion, so that when the carriage contacts the contact portion the brake rod rotates, disengaging the friction wheel from the friction drum and braking the friction wheel and with it the chipper carriage.

7. An apparatus as claimed in claim 1 in which the feed carriage feed mechanism includes:
   i. a second hinged arm having inner and outer ends, the arm being hinged for rotation about the inner end, a second feed shaft driving drive means coupled to the feed carriage, a second friction wheel journalled for rotation at the outer end, the friction wheel being mounted on a clutch shaft having a clutch pulley, the clutch shaft coupled to the second feed shaft,
   ii. a friction cylinder coplanar with and adjacent the second friction wheel, the friction cylinder being driven in one direction and having a line shaft pulley secured thereto,
   iii. a belt extending between the clutch pulley and the line shaft pulley, the belt having sufficient length to be slack when the second friction wheel is in contact with the friction cylinder, so that when the hinged arm is swung into a first position where the belt is taut, the clutch shaft is driven in one direction by the taut belt driven by the feed shaft pulley and the feed carriage is fed in one direction, and when the arm is swung into a second position where the friction wheel contacts the friction cylinder, the friction wheel and the clutch shaft are driven in an opposite direction the belt remaining slack as in a slipping clutch, and the feed carriage is fed in an opposite direction.

8. An apparatus as claimed in claim 1 in which the cutting means includes:
 i. a saw carrier having inner and outer ends, the carrier being hinged for rotation about the inner end of the carrier, the carrier having an arbor journalled for rotation at the outer end, and a powered shaft at the inner end,
 ii. a saw powered by the shaft and mounted on the arbor so that when the carrier rotates about the inner end thereof the saw swings through an arc and remains coplanar with a diametrical plane of a turned log carried in the slide trough, so as to cut a radial slot along the turned log when the log is fed through the cutting means,
 iii. a grooving cutter mounted on the powered shaft and positioned so as to be symmetrical about the diametrical plane of the turned log and to cut a groove along the turned log, side walls of the groove so produced being spaced symmetrically on either side of the slot,
 iv. a depth of cut control cooperating with the saw carrier so as to rotate the carrier and swing the saw to a particular position to cut a slot of selected depth in the turned log, thus producing a slotted and grooved log.

9. An apparatus as claimed in claim 8 in which the depth of cut control is automatically adjustable and includes:
 i. a sensor arm having an inner and outer end, the inner end being hinged to a portion of the apparatus to permit the arm to rotate, the outer end having a shoe to contact an upper surface of a log in the slide trough,
 ii. a link connecting the sensor arm to the saw carrier so that rotation of the sensor arm rotates the saw carrier,
so that before a leading end of a log sliding along the slide trough reaches the cutter means, the leading end contacts the shoe which rotates the sensor arm, thus rotating the saw carrier to bring the slotting saw into a particular position for cutting a slot having a depth appropriate to log diameter.

10. An apparatus as claimed in claim 8 further including a log restraining means having:
 i. a pair of spaced flaps having inner and outer edges, the inner edges being hinged to rigid portions of the apparatus adjacent the cutting means, the flaps straddling the log and being swingable about the inner edges so that the outer edges contact opposite sides of the log,
 ii. resilient means extending between rigid portions of the apparatus and the hinged flaps, the resilient means urging the outer edges of the flaps into engagement with the log so as to tend to center the log in the slide trough.

11. Apparatus as claimed in claim 1 in which the slide trough includes:
 i. spaced parallel first and second rails extending lengthwise along the slide trough,
and the feed carriage includes:
 ii. a trolley extending between and cooperating with the rails, the trolley having rollers resilient mounted to accommodate variation in spacing between the rails.

12. Apparatus as claimed in claim 11 in which the trolley includes:
 i. a longitudinal member,
 ii. a first pair of spaced rollers journalled for rotation on one side of the member so as to contact the first rail of the slide trough.
 iii. a second pair of spaced rollers journalled for rotation on an opposite side of the member, the rollers being mounted so as to be urged outwards from the longitudinal member against the second rail of the slide trough. so that as the carriage traverses the slide trough, variations in spacing between the rails are accommodated by movement of the second pair of rollers relative to the longitudinal member.

13. Apparatus as claimed in claim 12 wherein:
 i. the longitudinal member has a pair of spaced bellcrank brackets,
 ii. a bellcrank is journalled on each bellcrank bracket, each bellcrank having outer and inner ends, each outer end journalling one roller of the second pair of rollers, each inner end being resiliently connected to a rigid portion of the carriage to urge the respective bellcrank in such a direction as to force the respective rollers outwards from the longitudinal member against a rail of the slide trough.

14. Apparatus as claimed in claim 1 in which the seat of the feed carriage is V-shaped and includes:
 i. two walls disposed symmetrically relative to the slide trough at an angle to each other, inner faces of the walls accepting an end of the turned log therebetween,
 ii. log engaging means on the inner faces of the walls adapted to penetrate the end of the log so as to restrict the log against rotation.

15. Apparatus as claimed in claim 14 in which the seat further includes:
 iii. seat guide means of the seat cooperating with the slide trough to restrict movement of the seat to essentially axial movement along the trough.

16. Apparatus as claimed in claim 14 in which:
 i. the slide trough has a pair of spaced parallel rails,
and the guide means includes:
 ii. an outer edge of each seat wall is provided with a recess complementary to an adjacent rail of the slide trough, the rail sliding within the recess so as to limit movement of the seat wall relative to the slide trough.

17. Apparatus as claimed in claim 1 in which the slide trough includes:
 i. a lower rail to carry the turned logs, the lower rail having a longitudinal axis and two flanges parallel to the axis, the flanges having upper edges spaced to engage the turned log so as to support the log and to restrain the log to axial motion along the slide trough.

18. Apparatus as claimed in claim 17 wherein:
 i. the flanges of the lower rail are inclined at an angle to each other and the upper edges are spaced to accommodate a range of turned log diameters of about 2:1.

19. Apparatus as claimed in claim 1 in which the cutter of the chipper carriage includes:
 i. a chipper unit having a motor, a chipper head driven by the motor for cutting the log, the chipper head having peripheral chipping knives disposed in a diametrical plane.

20. Apparatus as claimed in claim 19 wherein:
 i. the bed has a pair of spaced rails,
 ii. the chipper carriage includes a platform extending between the rails of the bed, the platform having means cooperating with the rails to restrain motion of the chipper carrige to essentially axial motion along the bed,
 iii. the diametrical plane of the chipper head is inclined at an angle to the axis of the turned log, which angle is compatible with a helix angle of cut produced on the log as the carriage is traversed along the bed with the chipper head cutting the log so as to turn the log to cylindrical form.

21. Apparatus as claimed in claim 20 further including:
 iv. a second chipper unit having a second chipper head having a diametrical plane similarly inclined at the helix angle of cut of the log, the second chipper head being disposed on a side of the log remote from the first chipper head, the first chipper head being disposed in advance of the second chipper head, so that the first chipper head takes a roughing cut, and the second chipper head takes a finishing cut simultaneously.

22. Apparatus as claimed in claim 3 in which the outfeed conveyor includes:
 i. a conveyor guide on an upper surface of the conveyor, the guide being complementary to a slot and groove of the slotted and grooved log leaving the cutting means, and guide adapted to engage the slotted and grooved log to restrict the log to axial feed along the conveyor,
 ii. unloading means having a lowered position clear of the slotted and grooved log on the outfeed conveyor, and a raised position in which the log is lifted clear of the guide means and is free to move transversely relative to the conveyor.

23. Apparatus as claimed in claim 22 in which:
 i. the conveyor guide includes:
 ii. a block having spaced parallel side walls and an upper face complementary to spaced side walls and face of the groove in the slotted and grooved log, the block engaging the groove,
 iii. a fin extending upwards from the block, the fin engaging the slot of the slotted and grooved log,
 and the kick-off means includes
 iii. a plate, a hinged arm having an upper end supporting the plate, the arm being hinged so as to swing the plate from the lowered position in which an upper surface of the plate is below the conveyor, to the raised position in which the upper surface of the plate is clear of the fin.

24. Apparatus as claimed in claim 23 in which
 i. the plate is inclined at an angle to the horizontal in a vertical plane normal to feed direction of the log, the inclination being sufficient to promote rolling of the log transversely across the plate normal to the feed direction when the kick-off means is in the raised position.

* * * * *

UNITED STATES PATENT OFFICE
CERTIFICATE OF CORRECTION

Patent No. 3,848,647           Dated November 19, 1974

Inventor(s) Charles Raymond Fell

It is certified that error appears in the above-identified patent and that said Letters Patent are hereby corrected as shown below:

On the cover sheet insert -- [30] Foreign Application Priority Data   Great Britain   58402   Dec. 16, 1971 --.

Signed and sealed this 24th day of June 1975.

(SEAL)
Attest:

RUTH C. MASON
Attesting Officer

C. MARSHALL DANN
Commissioner of Patents
and Trademarks